IMAGE TRANSMISSION SYSTEM

Filed Feb. 11, 1966 3 Sheets-Sheet 1

INVENTOR.
JOHN F. BRINSTER
BY: Ralph K. Bonell
AGENT

IMAGE TRANSMISSION SYSTEM

Filed Feb. 11, 1966 3 Sheets-Sheet 2

INVENTOR.
JOHN F. BRINSTER
BY: Ralph K. Bonell
AGENT

Dec. 2, 1969 J. F. BRINSTER 3,482,040

IMAGE TRANSMISSION SYSTEM

Filed Feb. 11, 1966 3 Sheets-Sheet 3

INVENTOR.
JOHN F. BRINSTER

BY: Ralph K. Bonell

AGENT

United States Patent Office 3,482,040

Patented Dec. 2, 1969

3,482,040

IMAGE TRANSMISSION SYSTEM

John F. Brinster, 271 Mercer Road, Princeton, N.J. 08540

Filed Feb. 11, 1966, Ser. No. 526,765
Int. Cl. H04n 3/00; H04m 11/06
U.S. Cl. 178—6.8 2 Claims

ABSTRACT OF THE DISCLOSURE

A television system is shown for transmission of still pictures and voice sequentially over a standard telephone circuit. Magnetic recording is employed to record a single frame of picture signals at high speed at both calling and called units. Bandwidth is compressed by playing back the recorded frames successively at slow speed to exchange pictures between calling and called stations. The received images are then repeatedly displayed at high speed to provide flicker-free viewing of a still picture of the other party. The disclosed control means comprises a nine-position stepping switch which programs identical calling and called units successively to RESET, LOCAL PHOTO READY, LOCAL PHOTO RECORD, LOCAL PHOTO DISPLAY, TRANSMIT-RECEIVE-READY, TRANSMIT-RECEIVE, RECEIVE-TRANSMIT, REMOTE PHOTO DISPLAY, and REST positions. Transmitting and receiving tones are exchanged to indicate readiness to receive and ends of transmissions of pictures. Pushbuttons are provided for the rapid change to RESET, and PHOTO DISPLAY positions.

This invention relates to a method of and means for displaying at a terminal of a telephone or other transmission circuit an unvarying image of a person at another terminal remote therefrom. It particularly refers to an improved method and means whereby this image can be established and electrically transmitted over a circuit of conventional telephone circuit capabilities.

Systems have been developed and are presently in use which provide facilities for displaying a continuously changeable or mobile image of a remote person with whom a telephone conversation is being carried on. Such systems require the use of a special transmission circuit, one that is capable of handling a wider band of signal frequencies than that for which the circuits of the commerical telephone network are designed. These image transmission circuits, which are not in regular or widespread use, are costly both to set up and to maintain. The terminal equipment associated with them likewise is of a nature that makes for high system costs. In consequence, the charge for this type of service is relatively high. Other systems which presently may have the capability of transmitting still images are complex, costly, physically large and are not suited for common usage.

The system of the present invention, which uses relatively simple terminal equipment and permits image transmission over wide-spread existing commercial telephone circuits, offers as realistic possibilities a lower service charge and expanded use of the facility. The basis on which the design of the system rests is the fact that a remote person with whom a telephone conversation is being carried on can be recognized (and other characteristic information obtained or psychological satisfaction derived) by observing a still, instead of a mobile image of that person, and that such an image can, with economical equipment, as herein disclosed, be transmitted over the line in a reasonable time by electrical impulses whose component frequencies lie within the band commonly utilized for voice transmission.

In outline, the system comprises means for impressing, for a short period, a visual image or "snapshot" of a talker on a photoelectrically sensitive screen, such as the screen of a television transmitting tube. By an electronic scanning process which preferably covers the screen only once, a sequence of electrical impulses or signals is obtained that represents a single "frame" of the impressed image. These signals are then compactly stored in the simplest magnetic form. Both the scanning and storing operations are carried on at a relatively high speed. Subsequently, at a lower speed, the signals are read out of the magnetic storage medium for transmission over the line, this lower speed allowing the essential frequencies involved to fall within the voice transmission band commonly used in telephony. Operation in this manner is possible because the rapid succession of frames required for the presentation of a mobile image is not called for. Upon reception at the distance terminal the image signals are first stored, magnetically, at the low speed at which they are received and then read out at a high speed for utilization in the formation and display of a replica of the original visual image. The read-out process is repetitive to permit the image to be retained on a display screen, in unvarying form, for as long as may be desirable. Image transmission over the line in both directions is provided for and the simultaneous display of the two images during the conversation period.

The equipment at each terminal is the same. Switching arrangements allow this equipment to be placed in a condition appropriate for either a calling station (a station at which a call is initiated) or a called station, as required. Other switching arrangements provide for the sequential changes in circuit connections required in carrying out the program according to which the system operates. Still further circuit controls, manually operable, permit the program to be halted at a selected point or to cause selected steps of the program to be repeated at the will of the party whose image is being transmitted.

It is an object of the invention to provide an improved method of and means for displaying at one terminal of a transmission circuit of limited capabilities a current unvarying image of a person or other material object at another terminal of the circuit.

Another object is to provide an improved method of and means for obtaining a sequence of electrical impulses representative of an unvarying visual image of a person, as currently appearing at a terminal of a telephone circuit, and for the transmission of a version of said sequence to a distant terminal of the circuit for use in the display of said image thereat, said version being adapted to transmission over a circuit having a frequency transmission band limited to that employed for voice transmission over commerical telephone networks.

Another object is to provide simplified means, relative to the present art, for displaying to a person engaged in a telephone conversation, over a circuit of commercial network capabilities, a current representation of the person with whom the conversation is carried on.

Another object is to provide improved means for deriving an electrical version of a non-mobile image of a person at a terminal of a telephoen circuit, said version being characterized by components of relatively high frequency, and for transmitting over the circuit to the distant terminal thereof another electrical version of said image characterized by components of a relatively low maximum frequency.

Another object is to provide an improved system of image transmission comprising means for converting a sequence of electrical impulses representing a still image of a person, or other material object, at a terminal of a telephone circuit into another sequence of electrical impulses respectively corresponding thereto but characterized by component frequencies lying without the band occupied by the components of said first sequence.

Another object is to provide an improved system of image transmission utilizing as the transmission medium therefor a circuit adapted to transmit only the frequencies employed in voice transmission over the circuits of commercial telephone networks, image transmission according to said system being controlled by means providing at selected times various sequences of electrical impulses each representative of the transmitted image, said means having the further functions of selecting and utilizing suitable ones of said sequences for transmission over said circuit and for the visual display of the image, respectively.

Another object is to provide in a system of the above character means for carrying out a selected program of operation incuding the events of storing a version or versions of the transmitted image, transmission of an electrical version of the image over a commercial telephone circuit and the visual display at different times of the same image at both near and distant terminals of the circuit.

Another object is to provide means for carrying out such a program alternatively in automatic manner or as a series of said events, controllable as to their sequence and timing.

Another object is to provide improved means for timing the duration of selected ones of said events.

Another object is to provide a system for displaying at each terminal of a commercial telephone circuit a still image of a person at a distant terminal of the circuit which is selected by the person for the purpose of display.

Other objects and advantages of the invention will become apparent upon consideration of the following description of a preferred embodiment of the invention, taken in connection with the appended drawings, in which:

FIG. 1 is a wiring diagram, in simplified form, of terminal equipment suitable for the transmission and reception of voice and image signals over a telephone line and for image display, in accordance with the principles of the invention. In this figure the equipment is shown in a condition representing an early phase of operation of a calling station, that is, a station at which a call is initiated.

For simplicity and to be able to present the circuit of an entire terminal in a single figure the connections, are, in part, shown in single line form, as is common in block diagrams. Control circuits, however, are generally shown in more complete form, to aid in tracing their operation. Connections to sources of operating power are indicated only where the functioning of a component otherwise might not be clear. In the case of well known and commonly used components such connections will be readily understood by persons skilled in the art. The connection between the circuits of FIGS. 1 and 2, when in use, is by of a telephone line 65, whose respective terminals at the two stations are indicated in the figures.

Before passing to a detailed description of the operation of the system the general nature and the functions of certain of the more important units thereof will first be considered.

Figure 1:
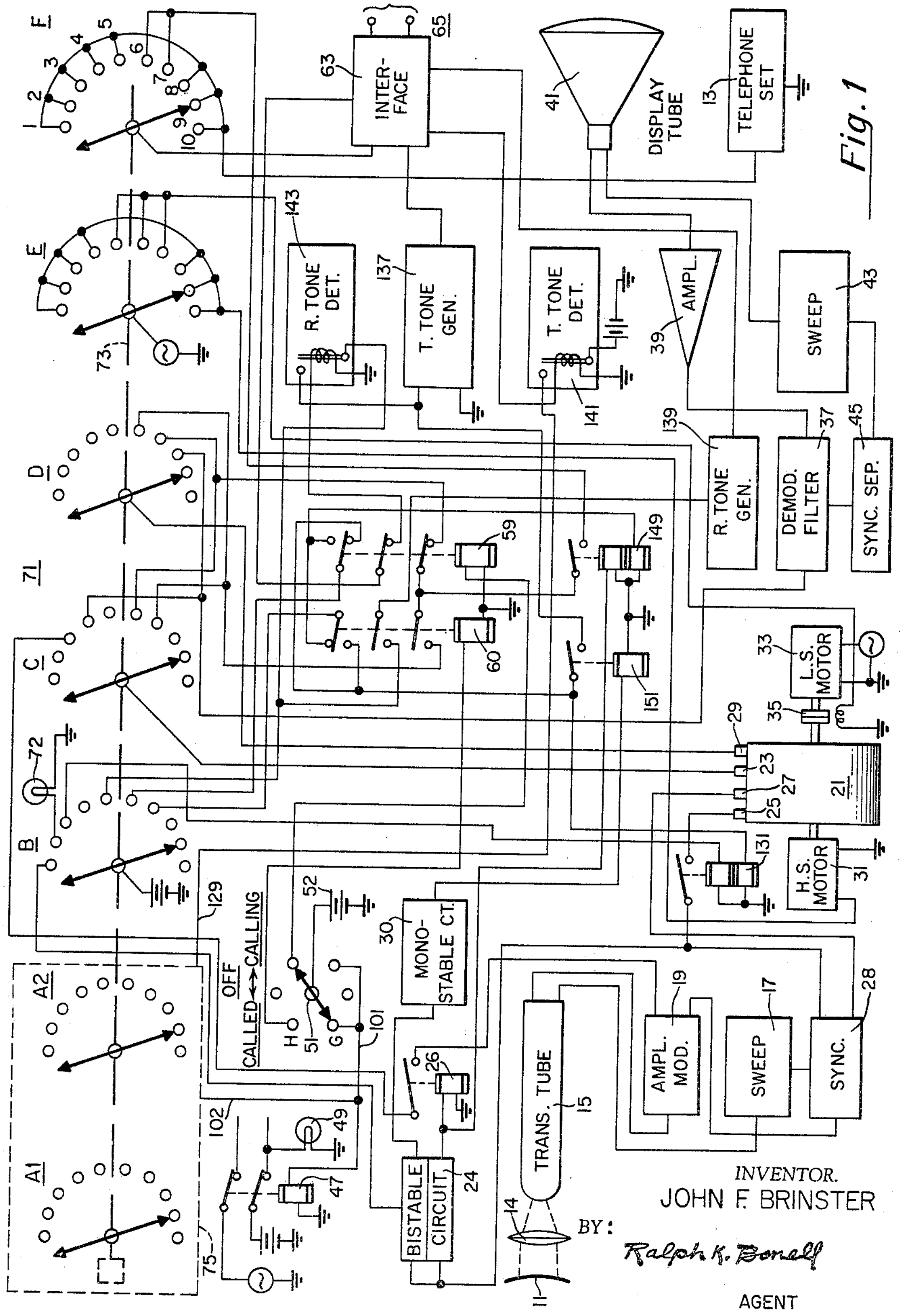

In FIG. 1, a person 11 (indicated by a curved line at the left of the figure) making a telephone call through the use of telephone set 13 (appearing at the right of the figure) is assumed to be physically located so that by virtue of the constant or programmed illumination provided at the terminal; and by means of suitable optical arrangements (indicated as lens 14) his image is caused to be incident upon the photo-electrically sensitive screen of transmitting tube 15. This may be of the Vidicon or other type transmitting tube found in television equipment. In the operation of such a tube a visual image incident upon its screen is transformed into, and stored, as a pattern of electric charges from which a sequence of electrical impulses representative of the original image can be read out by a scanning process employing an electron beam, in the known manner. Alternatively the image may be exposed by shutter and then read out more slowly to stop motion. The sweep of the scanning beam is controlled by Sweep Circuit 17. The output impulses from tube 15 are amplified and modulate a carrier wave in Amplifier-Modulator 19. The source of the carrier wave is not shown. Preferably, frequency modulation is employed.

The modulated wave, or any desirable side-band portion thereof, for example, an FM carrier with its excursions and lower side band, is recorded on magnetic drum 21 by magnetic recording and reproducing head 23. For simplicity, known erasing means for clearing the recording track are not shown and may not be required in certain types of recording such as saturation and near-saturation recording. Magnetic heads, 25 and 27, respectively read out from drum 21 frame and line synchronizing impulses which are induced in the heads either by permanently magnetized areas of the drum itself or by magnetic means mounted on the drum. Blanking impulses, as known and utilized in the TV art, are added by Synchronizing Circuit 28. Synchronizing and blanking impulses both are applied by way of Amplifier-Modulator 19. The various auxiliary impulses added to the image signals proper are later separated therefrom, in demodulated form, for the performance of their known functions in the display of the image on a cathode ray tube. A fourth magnetic head, 29, serves to record on drum 21 and to read out therefrom similar image signals received from the distant station. If desirable the functions of recording and read-out (playback) may be performed by different magnetic heads, in tandem along a single storage track, instead of by a single head.

Although not a necessary feature of the invention, it will be considered herein, unless otherwise stated, that the single frame image which is being processed is magnetically recorded on drum 21 in something less than a complete revolution of the drum and that, desirably, the carrier frequency, the scanning speed and the drum speed are chosen so as to result in a recorded signal density as high as is currently feasible, to limit the drum size. More complex versions of the invention may include a multiplicity of storage trains or time divisions thereof. As alternative storage means to a drum or drums, magnetic disks are commonly employed storage media.

The frame synchronizing impulses assumed, in accordance with the foregoing statement, to occur once in each revolution of the drum, are utilized to time the recording and read-out processes. In this connection they act through the agency of Bistable Circuit 24 and means controlled thereby. The latter include relay 26, symbolizing what in practice may be faster-acting gating means controlling the application of image signals to head 23, Monostable Circuit 30 and other gates or relays cited in connection with the detailed description of the operation of the equipment.

Provision is made for rotating drum 21 at two speeds. Motor 31 provides the higher speed, employed during the local recording of image signals and during the display of a recorded image. Motor 33 provides a lower speed for the read-out of image signals to the telephone line, to achieve the object of keeping the frequency band of these signals within the transmission band of the line, and for the recording of image signals received from the line. Regarding the frequencies involved, the upper limit for transmission over the lines of commercial telephone networks is of the order of 2500 to 3000 cycles per second. The maximum initial image frequency resulting from the scanning of tube 15 is well above this limit. The speed of either or both of the driving motors may be stabilized by the use of impulses derived from magnetized areas of the drum.

FIGURE 1 shows motor 33 as being connected to the drum shaft by magnetic clutch 35 while motor 31 is in permanent driving connection therewith. The simplification resulting from the latter arrangement is feasible since at the driving speed of motor 33 the rotor inertia of motor 31 is, actually, advantageous. The use of a single motor with suitable selective networks is not precluded.

The description, thus far, has indicated the means employed in the scanning of tube 15 and the production of a sequence of electrical signals which is magnetically recorded in modulated form on drum 21, this sequence representing a still image of the calling person, or, in TV terminology, a single "frame." Provision is made for the immediate local display of this recorded image. Switching means, to be described, allow magnetic head 23 to play back or read out the signals in its track to Demodulator-Filter 37. After demodulation and later amplification by Amplifier 39 these image signals, of well-known form, are supplied to cathode ray Display Tube 41. This is the same tube that at a later phase of the operation displays the image that is received from the remote station and is locally stored for that purpose.

During the read-out for local image display drum 21 is rotated at its high speed, by motor 31. Circuits producing auxiliary impulses required for display purposes include Sweep Circuit 43 and Synchronizing Signal Separation Circuit 45. The latter filters out or selects the demodulated synchronizing and blanking impulses included in the complete recorded signals, using conventional techniques.

Operating power is supplied to the equipment from suitable D.C. and A.C. sources by way of the contacts of two pole, magnet-operated switch or relay 47, with one exception noted below. The closed condition of this switch is indicated by the lighting of lamp 49. For a reason later pointed out, this switch, preferably, is of the slow release type. Consistent with earlier remarks regarding the indication of power sources for the various equipment units, branched connections from the equipment side of the contacts of switch 47 are not shown in the diagrams. Instead, individual sources of D.C. and A.C. are indicated adjacent to the apparatus units where this is considered desirable, largely for purposes of more completely tracing the control circuits of the system. Except in the one case referred to above, each such showing of a power source is a concise way of indicating an operative connection to one or the other of the power sources, D.C. and A.C., controlled by switch 47.

The means for placing a terminal equipment in either a calling or called condition is shown as a manually operable, double pole, three position switch, in FIG. 1 switch 51. In certain forms of the invention this switch may be automatically controlled, or its functions performed, in connection with the calling and answering processes. The two switch poles are referenced G and H, respectively. The switch positions are designated "CALLING," "OFF" and "CALLED." In the "OFF" position, of switch 51, magnetic switch or relay 47 is unoperated and no power is supplied to the equipment by way of its contacts. However, a permanent connection exists between a terminal of a suitable power source, indicated as source 52, and the two wipers of switch 51. Thus when the switch is turned to either its "CALLING" or "CALLED" position the magnet of power switch 47 is energized by way of a contact of pole G of switch 51, with the result that operating power is then supplied to the equipment.

Figure 2:
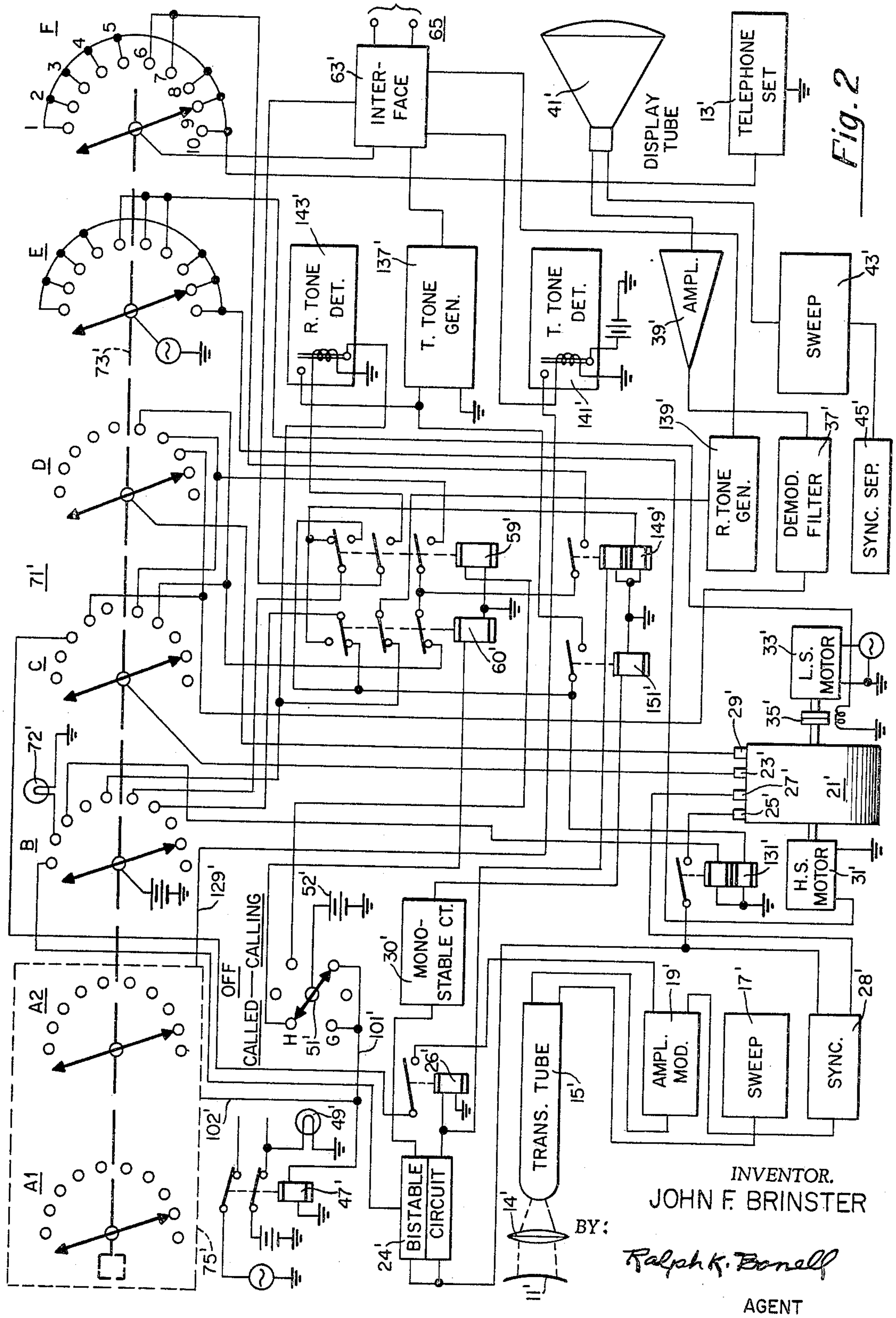
FIG. 2 is a similar diagram of the same equipment shown in a condition representing a corresponding phase of the operation of a called or answering station. The equipment units being the same at the two stations, like components bear like reference numerals, except that in the diagram of FIG. 2 these numerals are primed.

The placing of switch 51 in its "CALLING" position also causes, by way of pole H thereof, the operation of triple-contact (including one transfer contact) relay 59 and the setting up of certain connections appropriate to calling station operation, as seen in FIG. 1. In its "CALLED" position, as seen in FIG. 2, the switch, there referenced 51', causes the operation of relay 60', identical with relay 60 of FIG. 1, to set up called station connections.

Apparatus unit 63, at the right of FIG. 1, is designated "Interface" since it represents the demarcation between the local circuits and the telephone line 65. Various standard designs of such a unit, known as "Data Sets," are available to telephone subscribers desiring data communication service and special designs can be arranged for. Descriptions are given in technical bulletins issued by the telephone companies. These Data Sets accept both voice and data signals and make such modifications as are necessary, or desirable, for transmitting them over the commercial telephone network. If all the functions performed by such commercial apparatus are not required in the operation of the present system, a simplified unit may form an integral part of the terminal image equipment, itself.

In the disclosed system the production, conversion and transmission of the various signals and the display of the visual images involve a sequence of steps, or a program, in which the internal connections of the equipment are successively arranged in different ways. This is performed by sequencing means shown in FIG. 1, by way of example, as a stepping switch 71, a component which operates in a manner similar to sequencing means found in automatic telephone switching apparatus. Switch 71 has seven poles, A1, A2, B, C, D, E, and F, of ten contacts each. In the diagram the contacts are numbered at pole F, only. These numbers are also used in referring to the positions of the switch wipers and to the operating positions of the switch, as a whole. The wipers of all the switch poles are mounted on a common shaft 73 for rotation in steps and in phase with one another.

Figure 3:
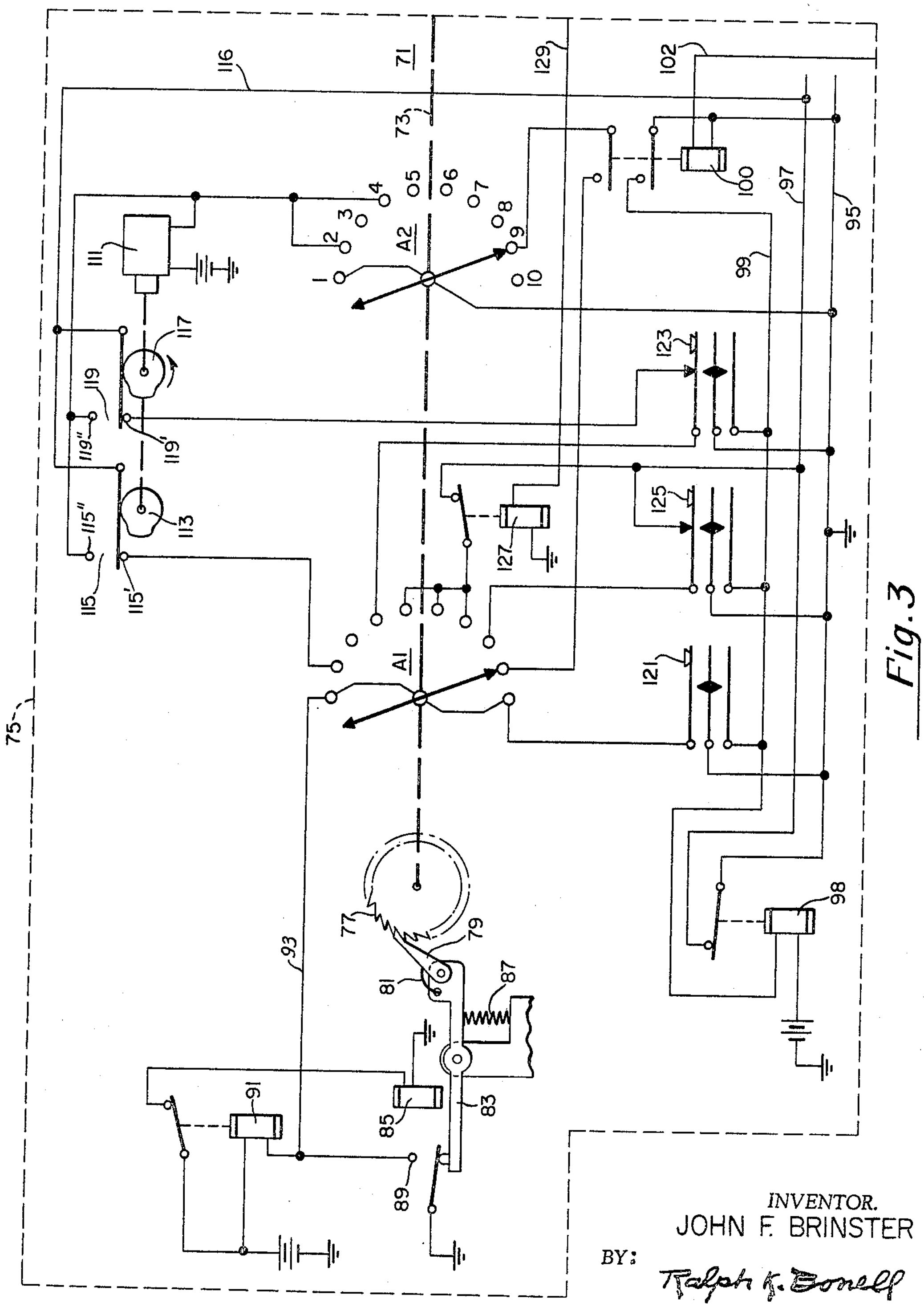
FIG. 3 is a detailed diagram of a portion of FIG. 1 which is there shown in block form.

Poles A1 and A2 are assigned the function of controlling the stepping of the switch. The connections to their contacts are shown in FIG. 3 which is a detailed diagram of that portion of the equipment included in block 75 of FIG. 1. An identical assembly of members for stepping switch 71' is indicated in FIG. 2 as block 75'.

Referring to FIG. 3, switch 71 is shown as spring-driven through the operation of a mechanism such as is found in certain existing, and commercially available, switches. This comprises a ratchet 77 rigidly mounted on shaft 73 and a cooperative pawl 79, the pawl being urged to engagement with the ratchet by flat spring 81. The pawl is pivotally mounted on an end portion of the armature 83 of electro-magnet 85, the armature itself being pivoted on stationary means. Thus, when the magnet becomes energized and its armature is attracted, pawl 79 is retracted from its initial position to engagement with the next following ratchet tooth. At the same time coil spring 87 is compressed so that upon the release of the armature, the ratchet (and shaft 73) is rotated by the action of the spring through an angle determined by the spacing of the ratchet teeth, this being the angle necessary to advance the switch wipers from one contact to the next. The release of the armature normally occurs automatically through the closing of a contact 89 near the end of its forward travel. This completes the actuating circuit of relay 91 whose operation, in breaking its back contact interrupts the circuit of magnet 85. The ensuing breaking of contact 89 and the release of relay 91 initiate a new sequence of the described stepping events. Thus, stepping of switch 71 will continue, automatically, at a rate determined by the selected mechanical and electrical constants of the stepping mechanism so long as relay 91 is not controlled otherwise than has been described above. These constants may be made to vary over an appreciable range.

When it is desired to hold relay 91 operated and thus arrest the stepping of switch 71, lead 93 is placed at ground potential. Various ways in which this is accomplished by connections to the contacts of pole A1 of the switch will be described. Since switch 71, with power supplied to the equipment, will step automatically, until the wiper of pole A1 rests on a grounded contact this mode of operation is sometimes described as "seeking a grounded contact."

The ultimate source of ground potential, in the circuit of FIG. 3, is the permanent ground applied to bus 95. Bus 97 becomes a secondary source while relay 98 is unoperated and the same is true of bus 99 while relay 100 is unoperated. Each relay, in its unoperated condition, furnishes a connection to bus 95 by way of a back contact.

The manner in which the apparatus included in block 75 operates to provide a program for the recording, display and transmission of the visual images with which the system is concerned can now be considered, referring, principally, to operations at the calling station, whose condition immediately following the operation of switch 51 to its "CALLING" position is seen in FIG. 1.

At the completion of a call, stepping switch 71 is left in its ninth position, with the wipers resting on the ninth contacts of their respective poles. This position of rest is determined by the grounding of the ninth contact of pole A1. With power shut off ground is applied to this contact by way of the top contact of relay 100, then unoperated, as further explained.

When switch 51 is placed in its "CALLING" position power relay or switch 47 is energized from power source 52 by way of lead 101 and its contacts close. Non-referenced power sources controlled by this switch, may be considered then to become active. By way of leads 101 (FIG. 1) and 102 relay 100 (FIG. 3) also becomes operated from source 52 and remains operated while switch 51 is away from its "OFF" position. The winding circuit of relay 98 is thus broken at the lower back contact of relay 100 and, at the open upper contact, the connection, noted above, between bus 95 and the ninth contact of pole A1 of switch 71, also is broken. This connection previously had existed by way of the ninth contact of pole A2 and the wiper of that pole.

With the removal of its ninth position ground, switch 71 steps to its next position, which may alternatively be considered its tenth or its first position in view of the two contacts on which the wiper of pole A1 simultaneously rests. Finding no ground in this position the switch steps, at its automatic stepping rate, to its second position.

In the described program arrangements, switch 71 dwells in its second position, as indicated by lighted lamp 72, powered at pole B, during a selected period longer than would otherwise occur in automatic stepping. The length of this period is fixed by the operation of delay means shown by way of example as timing motor 111 on the geared-down shaft of which cam 113 is mounted. Motor 111 is put into operation by the ground potential supplied from bus 95 at pole A2 of the switch and continues in operation until the camshaft has made one revolution. At the start and during the greater portion of this revolution the follower of cam 113 makes the lower contact 115'; of the transfer contact 115, which it controls. Ground potential derived from bus 97 over lead 116 is thus applied by way of this contact to the second contact of pole A1 of switch 71. Relay 98 is unoperated.

Near the end of the revolution of the camshaft the lobe of cam 113 lifts the follower and ground is removed from the second contact of pole A1. This allows the switch to resume its stepping. At this time the wiper of pole A2 leaves the second contact of that pole and breaks the path from ground bus 95 to motor 111. The motor continues to run, however, and completes its revolution because of the temporary connection to ground bus 97 resulting from the making of the upper contact, 115'', controlled by cam 113, until the cam lobe has passed the follower. In this manner a relatively prolonged dwell of switch 71, of selected duration, is provided for in its second position.

A similar selected dwell of the stepping switch is provided for in its fourth position by the operation of a second cam 117 on the output shaft of motor 111 which controls transfer contact 119. 119'' in the manner described for the cooperation of cam 113 and contact 115, 115''. It is to be understood that the switch positions above mentioned as ones for prolonged dwells are by way of illustrating the steps of a particular program and that these positions may be selected at will, Also, that a single cam on the shaft of motor 111 may control the contacts necessary for timing dwells in more than one switch position.

A second type of control for stepping switch 71 is provided by momentarily operable push buttons 121, 123, and 125. By depressing one of these buttons ground potential, derived from bus 95, is supplied to a selected one of the contacts of pole A1. The switch, which "seeks" a grounded contact, steps to the selected position and there comes to rest, or remains there, while the button is depressed, if already in that position. For example, when button 121 is partially depressed it supplies ground potential to the first (and tenth) contact of pole A1, this potential being derived from bus 95 by way of the upper contact made by the button. When fully depressed it further supplies ground to bus 99, by way of its lower contact. This operates relay 98 and removes ground from bus 97, for operational reasons.

Buttons 123 and 125 similarly are adapted to supply ground potential to the fourth and eighth switch contacts, respectively. Button 123, when depressed, also breaks a possible connection between the second and fourth switch contacts. These buttons, then, constitute a means, under the control of the person using the facility, for modifying the normal operating program. As will be more apparent upon consideration of the detailed description of the program given later herein, the operation of button 121 can be used to reset switch 71 to a position from which a complete new sequence of program events can be started; button 123 can be used to reset the switch to or hold it in the position in which there is a local display of the recorded image; while button 125 serves to bring the switch to the position in which there is a display of the image of the remote person. An extra contact on button 125 breaks a connection between the eighth switch contact and lead 97.

When relay 127 (FIG. 3, center) is unoperated, the fifth, sixth and seventh contacts of pole A1 of switch 71 receive ground potential from bus 97. Under this condition the switch will remain on whichever of these contacts it finds itself. In the presently described program ground is selectively removed from these contacts, in turn, by the operation of relay 127, to permit further stepping. This is brought about by applying a suitable potential to incoming lead 129, as later referred to.

With the foregoing general description of the functions of certain of the more important equipment units in mind, the program carried out by the system as a whole may be traced in more detail.

Before image transmission starts conditioning switches 51 (FIG. 1 ) and 51' (FIG. 2) are in their "OFF" positions and stepping switches 71 and 71' in their ninth positions. Normal voice communication is provided for by the connection of telephone set 13 to the line by way of pole F of Switch 71 and Interface 63, together with the connection to the line of telephone set 13' by way of pole F of Switch 71' and Interface 63'.

Assuming that both calling and called persons desire an exchange of their respective images, the one turns switch 51 to the "CALLING" position and the other turns switch 51' to the "CALLED" position, or, instead, these functions may be performed automatically in initiating and answering a call.

The lighting of lamps 49 and 49' indicates that power switches or relays 47 and 47' are operated and that both D.C. and A.C. are available for the operation of the equipment units. As earlier described, relay 59 becomes operated from pole G of switch 51 while relay 60' is operated from pole H of switch 51′, thus setting up certain connections respectively characteristic of the two stations.

Considering, first, the events occuring in calling station operation, with power supplied and the ground removed from the ninth contact of pole A1 of switch 71, as described, the switch steps to its tenth or first position. Also as noted, the switch can be moved to this position from another postiion by depressing push button 121 (FIG. 3). No processing of image signals takes place in this position, which may be termed the "RESET" position. Since neither of the occupied contacts of pole A1 is grounded, the switch advances at its normal rate to its second position and dwells there during the heretofore described operation of timing motor 111 and associated apparatus. The lighting of lamp 72 in this position, by way of switch pole B, gives notice to the calling person that the recording of his image will occur after a short interval and gives him an opportunity to assume a desired pose or make other arrangements for the recording. The second switch position may thus be termed the "LOCAL PHOTO READY" position.

After the operating cycle of timing motor 111 has been completed switch 71 steps to its third and then, automatically, to its fourth position. In the program here described no prolonged dwell in the third switch position is called for. Push button 123 serves to quickly reset the stepping switch to its fourth position at any phase of the program, when this may be desirable. It is assumed that the rapid stepping of the switch during a period of push-button reset produces no adverse effect on the operation of the equipment or that if such tendency exists sutiable means (not shown) are provided to counteract it.

From the second to the fourth switch position A.C. operating power is supplied to motor 31, by way of switch pole E, for the rotation of drum 21 at the relatively high speed selected for the recording and local display of the caller's image. Up to and including the fifth switch position telephone set 13 remains connected to the line, at pole F, to allow normal voice communication.

Going back to consideration of the connections and events that occur in the third swith position, termed the "LOCAL PHOTO RECORD" position, it is at this stage of the program that the caller's image is recorded, locally. For that purpose pole C of switch 71 connects the output of transmitting tube 15, amplified and modulated on a carrier wave by Amplifier-Modulator 19, to magnetic head 23 during such time as relay 26 is held operated by an output from Bistable Circuit 24. This circuit supplies alternate outputs over two paths depending upon the state to which it is operated, indicated in the diagram as outputs from the upper and lower halves of the block representation of the circuit. Provision is made in the first position of switch 71 to supply a potential to circuit 24, by way of switch pole B, that sets, or resets, the circuit to the state in which no output occurs from its lower half, an output from its upper half being of no significance at that time. Therefore, in the third position of switch 71 conditions are such that successive triggering impulses applied to circuit 24 will first produce an output that energizes relay 26 and then stop that output and deenergize the relay, to limit the duration of the recording process.

The start of the local recording process, and of the sweep for tube 15, is, in this manner, determined by the occurrence of the first frame synchronizing impulse generated in magnetic head 25 after switch 71 reaches its third position, that is, at the time such an impulse appears during the first revolution of drum 21 after the third switch position is reached. Since dual-winding relay 131 is then operated by the potential applied to its upper winding at pole B of switch 71, the synchronizing impulse reaches Bistable Circuit 24 and, as above described, triggers it to the state furnishing an output that operates relay 26. This relay completes the path for the transmission of image signals to magnetic head 23. The same synchronizing impulse starts Sweep Circuit 17 by way of Sync. Circuit 28.

The termination of the recording process is under the control of the next-occuring frame synchronizing impulse from head 25, in the second revolution of drum 21. This triggers the bistable circuit to its first state and thus releases relay 26, also as described, to break the recording path. In this manner a signal sequence representative of only a single image frame is recorded.

The fourth position of stepping switch 71 provides the connections for the local display of the recorded image of the calling person. Hence it may be termed the "LOCAL PHOTO DISPLAY" position. Drum 21 continues to be rotated at its high speed. Pole C of switch 71 now connects magnetic head 23 to cathode ray Display Tube 41, by way of Demodulator-Filter 37 and Amplifier 39. The recorded image is thus displayed on the tube with the aid of sweep and synchronizing impulses supplied by circuits 43 and 45, respectively, these latter signals being separated or extracted from the complete recorded signals and serving the same purpose as in conventional TV circuits. Switch 71 remains in its fourth position and his displayed image remains visible to the calling person for a period determined by the operation of timing motor 111 and associated apparatus, as described in connection with the second switch position. To avoid flicker, tube 41 on which the image appears may have a long persistence phosphor or appropriate modification for interlaced scanning may be employed.

Should the calling person not be satisfied with his displayed image, push button 121 may be operated to reset switch 71 to its first position and then allow it again to pass through the recording position, to record a new image and, later, to cause that image to be displayed for inspection. When satisfied, with the displayed image, the caller allows switch 71 to pass to its fifth position where, with relay 127 (FIG. 3) unoperated, it comes to rest due to the ground potential supplied to this contact from bus 97. At the calling station this position may be termed the "TRANSMIT-RECEIVE READY" position.

At pole E in the fifth position of switch 71, A.C. is removed from high speed motor 31 to stop its driving operation and, instead, the winding of magnetic clutch 35 is energized to permit drum 21 to be braked and then rotated at its low speed by motor 33. This motor has been running free since power was turned on.

The events thus far described as taking place at the calling station through the stepping of switch 71 to its fifth position are substantially duplicated at the called station. At the start of the call, the turning of switch 51′ (FIG. 2) to its "CALLED" position produces the same results as the placing of calling station switch 51 in its "CALLING" position except that as earlier noted, it is relay 60′ that is operated by way of switch pole H instead of the counterpart. 59′, of relay 59 at the calling station. This sets up connections distinctive of the called station. The program carried out under the control of stepping switch 71′ up to its fifth position may be followed by reference to the described program controlled by switch 71.

The advancement of switches 71 and 71′ beyond their fifth positions, the "TRANSMIT-RECEIVE READY" positions, marks the transition between the process of recording and local display of the visual images, and their transmission in electrical form over the transmission line to the communicating station. In the form of the invention here presented, simultaneous voice and image transmission is provided for in all but the sixth and seventh switch positions. It may be achieved in these positions, also, in other designs.

In the fifth and later switch positions two types of impulses or signals come into play that are both characteristic of and control the condition of the equipment. As to their nature, it is only necessary that they be readily distinguishable, one from the other. Here, they are considered to be audible tones of distinctive pitches, either of simple wave form or a more complex combination of wave forms, and are referred to as a Transmitting Tone and a Receiving Tone, respectively. The Transmitting Tone appears as a short "tone burst" or pulse supplied at the calling station by Transmitting Tone Generator 137. Circuits operating in this manner are known, for example for signaling and test purposes. Under certain described conditions a circuit such as Monostable Circuit 30 may control the duration of the tone burst. The Receiving tone is supplied by Receiving Tone Generator 139 which may be an oscillator of conventional design. Similar and corresponding units 137' and 139' are a part of the called station equipment (FIG. 2).

Whenever the Transmitting Tone is applied to the line it causes a response by both Transmitting Tone Detectors 141 and 141' at the calling and called stations, respectively. However, the Receiving Tone, when it appears on the line, is detected only by the Receiving Tone Detector at the station in the calling condition remote from the generator thereof. Thus a tone supplied by Receiving Tone Generator 139' causes a response by Receiving Tone Detector 143 only. Both tone detectors are here illustrated as of the known vibrating-reed relay type, each adapted to operate (here, close) at least one local circuit contact upon the reception of a tone (or tones) to which its reed (or reeds) is tuned.

As earlier brought out the placing of switch 51' (FIG. 2) at the called station in its "CALLED" position normally is followed by the advance of stepping switch 71' to its fifth position, to accomplish the intermediate processes of recording and local display of the image of the called person. Upon reaching its fifth position Receiving Tone Generator 139' is actuated by way of pole B of the switch and the middle contact of operated relay 60'. This puts Receiving Tone on the transmission line which is detected at the calling station by Receiving Tone Detector 143 whose winding circuit is completed at the middle contact of operated relay 59. If, and only if, switch 71 is in the fifth position, so that power is supplied to the local circuit of the detector at pole B, the operation of Tone Detector 143 actuates Transmitting Tone Generator 137 to put a burst of Transmitting Tone on the line. This results in a response by both Transmitting Tone Detectors 141 and 141'.

The closing of the contact of detector 141 supplies a D.C. potential to lead 129 which causes relay 127 (FIG. 3) to become operated. This momentarily breaks the ground connection between ground bus 97 and the fifth contact of pole A1 of switch 71 and thus, at its characteristic stepping ratio, the switch advances to its sixth position. If switch 71 is not in its fifth position the Receiving Tone may be made to persist, either as a continuous tone or in periodic bursts until this position is reached and the tone produces its desired effect. It will be noted that the advance of switch 71 to its sixth position is possible only when the two stepping switches are in phase in their fifth positions. The duration of the Transmitting Tone burst is such that relay 127 is released in time to hold switch 71 in its sixth position by the grounding of its sixth contact at bus 97.

In their sixth positions, the stepping switches, for the equipment here described, disconnect Telephone Sets 13 and 13' from the line, at their poles F, to reserve the line for image transmission, as before noted. At the calling station the sixth position may be termed the "TRANSMIT-RECEIVE" position. The sixth switch position at the called station may more appropriately be termed the "RECEIVE-TRANSMIT" position, both terms suggesting the sequence of operations at those stations.

The conditions under which read-out to the line of the image signals stored in drum 21 occurs are as follows: in the sixth switch position at the calling station the lower winding of dual-winding relay 131 (FIG. 1) is energized by way of pole B of the switch and the top closed contact of operated relay 59. The operation of relay 131 and the closing of its contact again, as in the third switch position, completes a path by which frame synchronizing impulses generated in magnetic head 25 can reach and trigger Bistable Circuit 24. As a consequence the framing impulse generated in head 25 during the first revolution of drum 21 (in the sixth switch position) triggers the bistable circuit to the state in which an output is delivered to the upper winding of dual-winding relay 149, and this relay becomes operated. The simultaneous operation of relay 26 at this time produces no useful effect. The impulse generated in head 25 during the second drum revolution reverses the state of the bistable circuit and releases relay 149. This relay, then, is operated during a period appropriate for the read-out to the line of the stored sequence of signals representative of the single frame recorded image. The path for these signals is from magnetic head 23 to switch pole C, the bottom closed contact of relay 59, relay 149, pole F of the stepping switch and Interface 63 to line 65. When it is desirable in the transmission of the image signals from head 23 that a new modulation or a different carrier wave be employed, for example, to obtain a more favorable signal to noise ratio, these signals may undergo detection and remodulation in known manner by means included in the Data Set (Interface 63) or in the image equipment, itself, with complementary operations occuring at the distant station.

At the called station, with stepping switch 71' in its sixth position the lower winding of dual-winding relay 149' is energized by way of pole B of the switch and the upper (back) contact of unoperated relay 59'. The path for the received image signals then is as follows: From line 65 to Interface 63', switch pole F, operated relay 149', the bottom closed contact of relay 60', switch pole D to magnetic head 29', which head records the signals on magnetic drum 21'.

Returning to the calling station, in the sixth switch position the mentioned second frame synchronizing impulse from head 25 in reversing the state of Bistable Circuit 24 causes an output from that circuit to Monostable Circuit 30. The output of the latter circuit at this time operates relay 151 for a selected short period determined by the constants of this transiently active circuit. The operation of relay 151 in turn, times the operation of Transmitting Tone Generator 137. The generator is put into operation by the potential applied to the wiper of pole B of switch 71, this potential being received over a path including the top closed contact of operated relay 59 and relay 151. Both Transmitting Tone Detectors 141 and 141' respond to the Transmitting Tone. The response of the former, by the closing of its contact, applies a potential to lead 129 which operates relay 127 (FIG. 3) and removes the ground supplied to the sixth contact of pole A1 of switch 71, thereby allowing the switch to advance to its seventh position. A similar action takes place at the called station (FIG. 2).

In the seventh positions of the stepping switches the functions of the calling and called stations are interchanged relative to their functions in the sixth positions. In this position the recorded signals of the called person's image are transmitted to the calling station. Thus, the seventh switch position at the called station may be termed the "TRANSMIT-RECEIVE" position while at the calling station it becomes the "RECEIVE-TRANSMIT" position. At this phase of the program the image signals recorded on called station magnetic drum 21' are read out by magnetic head 23' for transmission over the line and their recording on calling station drum 21 by magnetic head 29. Both drums are rotated at their slow speeds. The circuit connections employed in the seventh switch positions can be traced by generally referring to the description of the sixth position connections noting that now head 23' takes over the described role of head 23 and head 29 that of head 29'. In this switch position the lower winding of dual-winding relay 149 (FIG. 1) is energised at pole B of switch 71 by way of the upper (back) contact of unoperated relay 60.

The timing of the read-out of the image from drum 21' in the seventh position of switch 71' (FIG. 2) is similar to the described read-out at the calling station in the sixth position of switch 71. The beginning of read-out occurs at the time of the first frame synchronizing impulse from head 25'. When this occurs the lower winding of relay 131' is energized at pole B of switch 71' by way of the top closed contact of operated relay 60', so the synchronizing impulse triggers Bistable Circuit 24' to produce an output from its lower half which energizes the upper winding of relay 149' and operates the relay. Magnetic head 23' is thus connected to the line over a path including switch pole C, operated relay 60', operated relay 149' and switch pole F. The second frame synchronizing impulse terminates read-out through the reversal of state of Bistable Circuit 24', in described manner. Monostable Circuit 30' then is actuated to time the operation of relay 151' and Transmitting Tone Generator 137', also as previously described for image transmission from the calling station in the sixth switch positions. Both Transmitting Tone Detectors 141 and 141' again respond to the tone on the line, the former placing lead 129 at a potential that results in the operation of relay 127 (FIG. 3) and the removal of the ground supplied thereby to the seventh contact of pole A1 of switch 71. This switch then advances to its eighth position. At the same time a corresponding sequence of events allows switch 71' at the called station to advance to its eighth position.

The eighth switch position at both stations is the "REMOTE PHOTO DISPLAY" position in which the received and recorded image signals are utilized for the display of the visual images they respectively represent. The steps are the same at both stations and will be described as they occur at the calling station, only. At this stage, voice communication is restored by way of pole F of each stepping switch. A manually controlled reset to the eighth position is provided by push button 125 (FIG. 3). This is for the purpose of displaying a recorded image received from a remote station at any time—not necessarily in the program sequence.

In the eighth position of switch 71, at pole E thereof, magnetic clutch 35 is deenergized to disconnect low speed motor 33 from the shaft of drum 21. At the same time power is again supplied to high speed motor 31. The latter motor rotates the drum at a speed suitable for reading out the signals stored in the track of magnetic head 29, representing the image of the distant person, for the purpose of displaying a replica of the image on the face of Display Tube 41. The image signals pass from head 29 to this tube by way of switch pole D to Demodulator-Filter 37 and Amplifier 39. The necessary synchronizing and blanking impulses for image display are separated from the recorded signals by Synchronizing Signal Separation Circuit and the sweep impulses are provided by Sweep Circuit 43, as earlier described in connection with the display of the locally generated and recorded image.

Switch 71 remains in its eighth position indefinitely due to the supply of ground potential to the eighth contact of pole A1 from bus 97 by way of the top back contact of pushbutton 125 (FIG. 3). Relay 98 is still unoperated, its winding circuit being broken at operated relay 100. Thus, at the calling station (and in similar manner at the called station) the image of the distant person remains visible, by repetitive read-out from the recording drum, until the ground is removed from the eighth contact of switch pole A1.

The removal of ground from this contact occurs when switch 51 is turned to its "OFF" position at the completion of a call. This breaks the connection between power source 52 and lead 101 (also, lead 102). This immediate result is the release of relay 100 (FIG. 3) which causes, by way of its lower back contact, the operation of relay 98 and the removal of ground potential from bus 97, and hence from the eighth contact of switch pole A1. The foregoing operations are possible even though the magnet of switch 47 becomes deenergized when switch 51 is placed in its "OFF" position, since in its presently described form the slow release characteristic of this switch allows its contacts to remain closed for a short period after the energizing current of its magnet ceases.

This period also allows switch 71, with ground removed from the eighth contact of pole A1, to step to its ninth position where it again encounters ground potential at the ninth contact of this pole, supplied by way of the wiper of pole A2 and the top back contact of unoperated relay 100. Switch 71 therefore comes to rest in its ninth position, to remain there until image transmission sequence is initiated during the next call.

The turning of called station switch 51' to its "OFF" position similarly brings stepping switch 71' to rest in its ninth position.

To simplify the presentation of the disclosed embodiment of the invention and to clarify the functions of certain members of the equipment, these members have been shown and described as of a form which may not in all cases of practical design be selected as the most efficient or desirable, equivalent means performing like functions being available. As an example, solid state switching circuits may take the place of certain electromagnetic relays. Moreover, although the described circuit means is immediately applicable to the transmission and display of monochromatic images, like means or portions thereof may be used in the transmission of polychromatic or compatible monochromatic and polychromatic images. Furthermore, the displayed images may be made permanent by photographic or other techniques. Thus, it is to be considered that the disclosure herein is by way of illustration, only, and not by way of limitation, the scope of the invention being defined in the appended claims.

What is claimed is:

1. A television system for sending and receiving both image and speech signals over the same telephone line comprising a calling unit and a called unit interconnected by a telephone circuit, said units being of the same construction, each comprising a telephone for communicating speech over said telephone circuit;

an image receiver operating to store received image signals magnetically at a low speed and repeatedly reproducing them at a high speed to display on a fluorescent screen of a tube as a quiescent picture;

an image transmitting means including a camera operating to convert a static picture image of one frame into image signals, magnetic recording means to store said last-named image signals at high speed and to play back bandwidth compressed image signals at low speed, and a modulator for adapting said compressed signals to said telephone circuit; and control means;

characterized in that said control means comprise, a multipole, nine-position, stepping switch, a calling-off-called switch, a transmitting-tone generator, a transmitting tone detector, a receiving-tone generator, a receiving-tone detector, a "reset" push-button, a "remote" push-button, a "local" push button, and a dwell-time-delay means; wherein said calling-off-called switch in the "calling" position at said calling unit, and in the "called" position at said called unit, said stepping switch steps from its REST position to a RESET position and to a LOCAL PHOTO READY position and dwells there for a time controlled by said time-delay means, at the end of which time said stepping switches advance to a LOCAL PHOTO RECORD position in which position said stepping switches make connections between said camera and said recording means to store one frame of local image signals at high speed at each said unit, whereupon each said stepping switch is wired to advance to its next position, being held in this its LOCAL PHOTO DISPLAY position for said dwell time by said delay means, during said dwell time said stepping switch being responsive to said reset push-button to recycle to take a substitute local photo, at the end of said time said stepping switch otherwise advancing to a TRANSMIT-RECEIVE READY position at which position at said receiving unit said receiving tone generator is activated to transmit said receiving tone over said circuit to said calling unit, there to actuate said receiving tone detector if and only if said calling unit stepping switch is in said READY position, and in which READY position said receiving tone detector upon receipt of said receiving tone, activates said calling station transmitting tone generator to emit a burst of transmitting tone over said line, which said transmitting tone burst activates both said transmitting tone detectors, which in turn are connected to release said stepping switch to advance to the next position, a "TRANSMIT-RECEIVE" position wherein at slow speed one frame of recorded image signals is read out of said recording means of said calling unit and transmitted through said circuit to be recorded at said called unit, said frame being followed immediately by a further burst of said transmitting tone, whereupon both said units respond by advancing said stepping switch to a "RECEIVE-TRANSMIT" position wherein said one frame recorded in said "LOCAL PHOTO RECORD" position at said called unit is transmitted from said called unit recording means through said circuit to said calling unit recording means, followed by a tone burst from said called unit transmission tone generator, whereby said units are stepped to a REMOTE PHOTO DISPLAY position in which said recording means are operated at high speed to provide rapidly repeated image signals from said remote unit to display on a fluorescent screen as a quiescent picture, from which position, upon termination of a call said stepping switches advance to the next position, said REST position until the next call.

2. The combination including that defined by claim 1 which additionally comprises means responsive to said push-buttons for stopping automatic operation of said stepping switch at a particular step in said positions and for selectively re-starting automatic operation thereof at another position of said stepping switch.

References Cited

UNITED STATES PATENTS

| | | | |
|---|---|---|---|
| 1,980,150 | 11/1934 | Baird | 178—6 |
| 2,419,730 | 4/1947 | Potts | 340—163 |
| 2,420,198 | 5/1947 | Rosenthal | 178—6.8 |
| 2,878,310 | 3/1959 | Becker. | |
| 2,903,517 | 9/1959 | Ridings | 179—4 |
| 2,978,676 | 4/1961 | Spencer | 340—163 |
| 3,352,966 | 11/1967 | Sawazaki | 178—6.8 |

ROBERT L. GRIFFIN, Primary Examiner

J. A. ORSINO, JR., Assistant Examiner

U.S. Cl. X.R.

179—4